Patented Jan. 15, 1924.

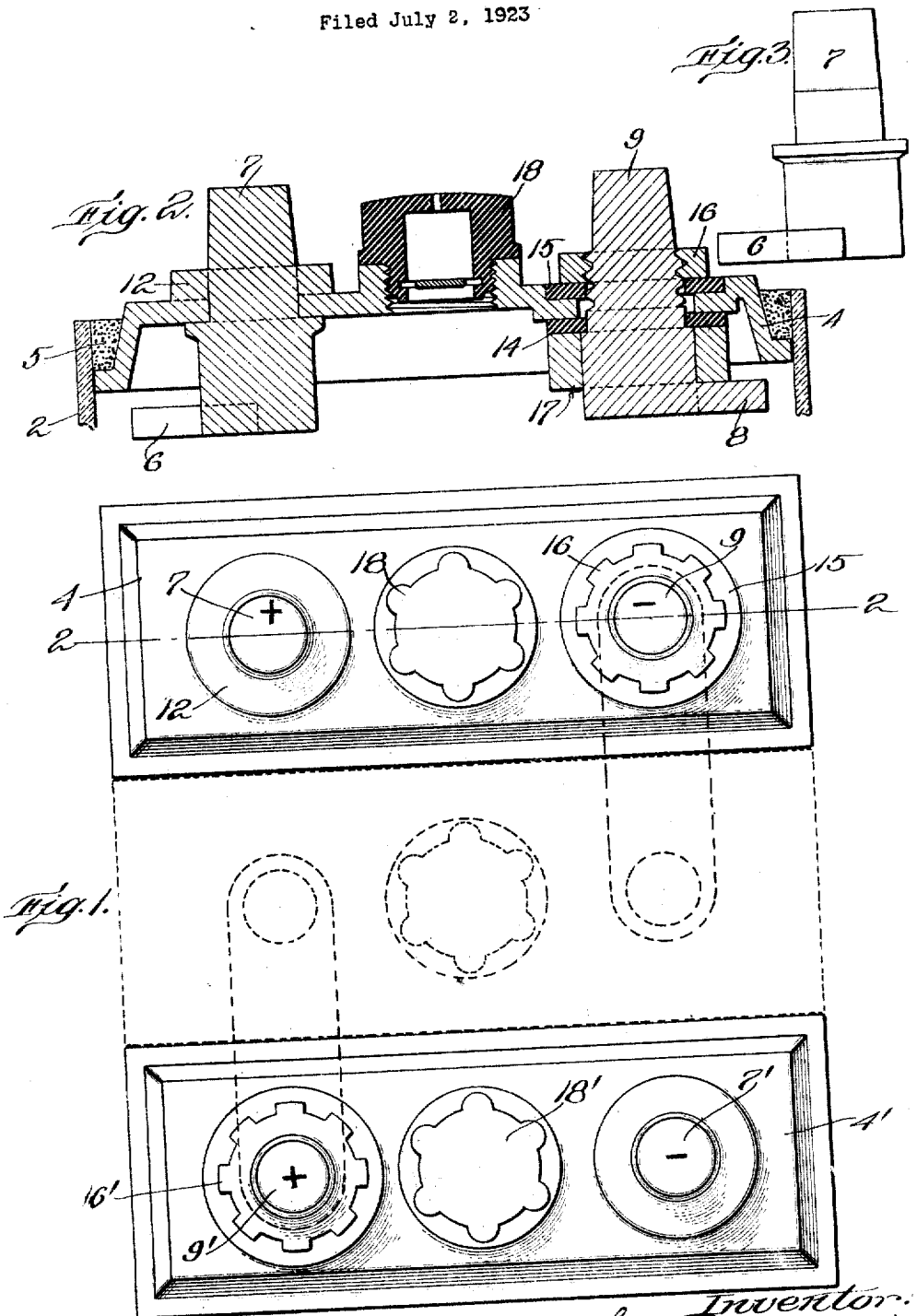

1,480,726

UNITED STATES PATENT OFFICE.

LOUIS JACQUEMIN, OF ORLANDO, FLORIDA.

STORAGE BATTERY.

Application filed July 2, 1923. Serial No. 648,864.

*To all whom it may concern:*

Be it known that I, LOUIS JACQUEMIN, a citizen of the United States, residing at Orlando, in the county of Orange and State of Florida, have invented certain new and useful Improvements in Storage Batteries, of which the following is a specification.

This invention relates to storage batteries and is especially concerned with those used in motor vehicles. The invention has for its chief object to prevent the corrosion of the connections leading to the battery which is a great source of annoyance in batteries as heretofore constructed.

The common commercial type of storage battery designed for automobile use consists of several battery units assembled in a box or like container, the electrodes of the units being connected together so that the entire assembly gives the desired voltage. Each of these battery units usually consists of a jar having two sets of battery plates therein, separators which insulate the plates from each other, and an electrolyte which nearly fills the remaining space in the jar. The cover of the jar consists of vulcanite, or some other insulating material, and the terminals project through this cover and are sealed into it, usually by means of sealing wax or some similar compound. As the battery is used, and particularly during overcharging, acid fumes are given off from the electrolyte, and these fumes escaping around the electrodes, and particularly around the positive terminal, come in contact with the connections and cause the corrosion above mentioned. A further cause of corrosion is the fact that the electrolyte climbs up the positive electrode due to capillarity or some similar action, and thus comes in contact with the connections to said electrode.

The present invention deals with the problem presented by these conditions and it aims to devise a construction which will prevent such corrosion of the connections.

The nature of the invention will be readily understood from the following description when read in connection with the accompanying drawings, and the novel features will be particularly pointed out in the appended claims.

In the drawings,

Figure 1 is a plan view of a battery embodying the present invention, the end cells only being shown in detail;

Fig. 2 is a cross sectional view on the line 2—2, Fig. 1; and

Fig. 3 is a side elevation of one of the terminals shown in Fig. 2.

The present invention deals especially with the construction of the cover and the terminals, the battery in other respects being of any suitable construction. For this reason only the upper part of the battery is shown. The battery elements of each unit, including the plates, separators and electrolyte, are enclosed in a jar 2, Fig. 2. A metal cover 4 is sealed in the upper end of the jar by sealing wax 5, or some other suitable material. The positive plates are fused or "burned" to a post strap 6 having a terminal stud 7 integral therewith, while the negative plates are united in a similar manner to a post strap 8 provided with an integral terminal stud 9. The parts 6 to 9 inclusive are usually made of lead, and the cover 4 preferably is made of lead also. Since the positive terminal 7 is fused or burned to the cover 4, as clearly shown in Fig. 2, these two parts are, to all intents and purposes, integral.

It is usually more convenient for manufacturing reasons to make the parts 4 and 7 separate and then to fuse or burn the terminal to the cover after the parts have been assembled in the relationship shown in Fig. 2. The cover is provided with an integral collar 12 to which the stud 7 may readily be fused by means of a suitable flame.

The negative terminal 9 is insulated from the cover 4 by means of two insulating washers 14 and 15 located below and above the cover, respectively, the upper washer 15 setting into a socket in the cover so that it mechanically spaces the terminal from the cover. This terminal is screw threaded to receive a nut 16 which draws the terminal upwardly and clamps the lower washer 14 between the cover and a lead shoulder or collar 17 on the lower part of the terminal. The nut 16 also clamps the insulating washer 15 firmly against the cover 4. The washers may be made of fibre, vulcanite, or other suitable material, and the method of clamping them in place forms a tight joint between this terminal and the cover.

The cover 4 is equipped with a filling cap 18 of the usual type.

The greater part of the trouble experienced with corrosion of battery connections occurs at the positive pole, although this action is also troublesome at the negative pole. For this reason, in assembling battery units to make a complete battery, I make the covers of the two end cells in the manner above described, except that the negative terminal at one end of the battery is fused to the cover, while the positive terminal is fused to the cover at the opposite end. This is clearly shown in Fig. 1, in which the positive and negative terminals of the battery are indicated at 7 and 7', respectively. The intermediate units may or may not have covers made as above described, and the number of these units employed will be determined by the voltage which the battery is to deliver, as will readily be understood by those skilled in this art. Consequently, the intermediate unit in Fig. 1 is illustrated only diagrammatically.

A battery made as above described may be connected into the circuit in the usual manner, but due to the fact that there is a fused or burned joint between the terminals to which the connections are made and the covers of the units through which these terminals project, there is no possibility of acid or acid fumes escaping through the cover immediately around the terminals where it will attack the connections. I have definitely determined that this construction completely avoids the corrosion which has proved so troublesome heretofore.

While I have herein shown and described the best embodiment of my invention that I have so far devised, I do not wish to be limited to the exact details of the construction shown.

Having thus described my invention, what I desire to claim as new is:

1. In a storage battery including a jar containing the battery elements, a metallic cover for said jar, a terminal fused to said cover, and another terminal insulated from said cover but supported thereby.

2. In a storage battery including a jar containing the battery elements, a metallic cover for said jar, a positive terminal fused to said cover, and a negative terminal projecting through said cover but electrically insulated therefrom.

3. In a storage battery including a jar containing the battery elements, a metallic cover for said jar, a positive terminal fused to said cover, a negative terminal projecting through said cover, insulating washers interposed between said negative terminal and said cover, said negative terminal having a shoulder thereon, and a nut threaded on said terminal and clamping said washers against said shoulder and cover.

4. In a storage battery, the combination of a plurality of battery units each including a jar containing the battery elements of its respective unit, connections between the electrodes of the units, and a metal cover for each of the end jars of said units, the negative terminal of one end jar being fused to the metal cover for said jar and the positive terminal of the opposite end jar being fused to its metal cover.

LOUIS JACQUEMIN.